United States Patent
Frost et al.

(10) Patent No.: US 11,182,552 B2
(45) Date of Patent: Nov. 23, 2021

(54) ROUTINE EVALUATION OF ACCURACY OF A FACTOID PIPELINE AND STALENESS OF ASSOCIATED TRAINING DATA

(71) Applicant: International Business Machines Corporation, Armonk, NY (US)

(72) Inventors: Keith G. Frost, Delaware, OH (US); Stephen A. Boxwell, Franklin, OH (US); Kyle M. Brake, Dublin, OH (US); Stanley J. Vernier, Grave City, OH (US)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 16/417,968

(22) Filed: May 21, 2019

(65) Prior Publication Data
US 2020/0372109 A1 Nov. 26, 2020

(51) Int. Cl.
*G06F 40/216* (2020.01)
*G06N 5/04* (2006.01)
(Continued)

(52) U.S. Cl.
CPC .......... *G06F 40/216* (2020.01); *G06F 11/302* (2013.01); *G06F 11/3079* (2013.01);
(Continued)

(58) Field of Classification Search
CPC .... G06F 40/216; G06F 40/247; G06F 40/284; G06F 40/30; G06F 40/49; G06F 16/128;
(Continued)

(56) References Cited

U.S. PATENT DOCUMENTS 9,621,601 B2 * 4/2017 Johnson, Jr. ......... G06Q 10/101
9,754,207 B2    9/2017 Allen et al.
(Continued)

OTHER PUBLICATIONS

Zhang et al., "A Topic Clustering Approach to Finding Similar Questions from Large Question and Answer Archives", published online Mar. 4, 2014, PMCID: PMC3942313, PMID: 24595052, pp. 18 (Year: 2014).*
(Continued)

*Primary Examiner* — Chau T Nguyen
(74) *Attorney, Agent, or Firm* — Stephen J. Walder, Jr.; David Mattheis

(57) ABSTRACT

A mechanism is provided for routinely evaluating an accuracy of a request processing pipeline. A set of questions is executed through the request processing pipeline, producing a list of answers, supporting documents, and accuracy metrics. A determination is made as to whether a document contribution value of each document associated with the answer is equal to or above a document contribution threshold value. For those documents equal to or above the document contribution threshold value, a snapshot is stored in a training-data data structure. Based on a clustering of questions, for each question cluster, a determination is made of an average accuracy metric. A comparison is performed and a determination is made as to whether an accuracy metric delta exceeds the accuracy metric threshold value. If so, a differential report is generated indicating a review is needed of a training of the request processing pipeline.

20 Claims, 5 Drawing Sheets

(51) Int. Cl.
*G06F 16/31* (2019.01)
*G06F 16/35* (2019.01)
*G06F 11/30* (2006.01)
*G06F 16/11* (2019.01)
*G06F 40/49* (2020.01)
*G06K 9/62* (2006.01)

(52) U.S. Cl.
CPC .......... *G06F 16/128* (2019.01); *G06F 16/328* (2019.01); *G06F 16/355* (2019.01); *G06F 40/49* (2020.01); *G06N 5/041* (2013.01); *G06K 9/6256* (2013.01)

(58) Field of Classification Search
CPC .. G06F 16/328; G06F 16/355; G06F 11/3079; G06K 9/6256
See application file for complete search history.

(56) References Cited

U.S. PATENT DOCUMENTS

| | | | | |
|---|---|---|---|---|
| 9,928,235 | B2* | 3/2018 | Beller | G06F 16/3344 |
| 2003/0154181 | A1* | 8/2003 | Liu | G06K 9/6226 |
| 2009/0006382 | A1 | 1/2009 | Tunkelang et al. | |
| 2011/0125734 | A1 | 5/2011 | Duboue et al. | |
| 2014/0297571 | A1* | 10/2014 | Beamon | G06F 16/313 |
| | | | | 706/12 |
| 2016/0034457 | A1 | 2/2016 | Bradley et al. | |
| 2017/0004204 | A1 | 1/2017 | Bastide et al. | |
| 2017/0109390 | A1 | 4/2017 | Bradley et al. | |
| 2018/0046938 | A1* | 2/2018 | Allen | G06N 5/02 |
| 2019/0138660 | A1* | 5/2019 | White | G06F 16/90332 |

OTHER PUBLICATIONS

Deepak P, "MixKMeans: Clustering Question-Answer Archives", Nov. 1-5, 2016, Proceedings of the 2016 Conference on Empirical Methods in Natural Language Processings, pp. 10 (Year: 2016).*

High, Rob, "The Era of Cognitive Systems: An Inside Look at IBM Watson and How it Works", IBM Corporation, Redbooks, Dec. 12, 2012, 16 pages.

Yuan, Michael J., "Watson and healthcare, How natural language processing and semantic search could revolutionize clinical decision support", IBM Corporation, IBM developerWorks, http://www.IBM.com/developerworks/industry/library/ind-watson/, Apr. 12, 2011, 14 pages.

* cited by examiner

ROUTINE EVALUATION OF ACCURACY OF A FACTOID PIPELINE AND STALENESS OF ASSOCIATED TRAINING DATA

BACKGROUND

The present application relates generally to an improved data processing apparatus and method and more specifically to mechanisms for routine evaluation of the accuracy of a factoid pipeline and staleness of associated training data.

With the increased usage of computing networks, such as the Internet, humans are currently inundated and overwhelmed with the amount of information available to them from various structured and unstructured sources. However, information gaps abound as users try to piece together what they can find that they believe to be relevant during searches for information on various subjects. To assist with such searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question.

Examples, of QA systems are Siri® from Apple®, Cortana® from Microsoft®, and question answering pipeline of the IBM Watson™ cognitive system available from International Business Machines (IBM®) Corporation of Armonk, N.Y. The IBM Watson™ system is an application of advanced natural language processing, information retrieval, knowledge representation and reasoning, and machine learning technologies to the field of open domain question answering. The IBM Watson™ system is built on IBM's DeepQA™ technology used for hypothesis generation, massive evidence gathering, analysis, and scoring. DeepQA™ takes an input question, analyzes it, decomposes the question into constituent parts, generates one or more hypothesis based on the decomposed question and results of a primary search of answer sources, performs hypothesis and evidence scoring based on a retrieval of evidence from evidence sources, performs synthesis of the one or more hypothesis, and based on trained models, performs a final merging and ranking to output an answer to the input question along with a confidence measure.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for routinely evaluating an accuracy of a request processing pipeline. The illustrative embodiment executes a set of questions though the request processing pipeline, producing a list of answers, supporting documents, and accuracy metrics, in response to ingesting a set of new documents into a corpus of a request processing pipeline. For each answer in the list of answers, the illustrative embodiment determines whether a document contribution value of each document associated with the answer is equal to or above a document contribution threshold value. For those documents with a document contribution value associated with the answer that is equal to or above the document contribution threshold value, the illustrative embodiment stores a snapshot of the answers, highly-contributing supporting documents, and accuracy metrics in a training-data data structure. The illustrative embodiment clusters together the questions using topic modeling. Based on the clustering, for each question cluster, the illustrative embodiment determines an average accuracy metric across the questions using the accuracy metrics associated with the answers stored in training-data data structure. The illustrative embodiment compares the average accuracy metric to an initial average accuracy metric. The illustrative embodiment determines whether an accuracy metric delta identified in the comparison exceeds the accuracy metric threshold value. The illustrative embodiment generates a differential report indicating a review is needed of a training of the request processing pipeline in response to the accuracy metric delta the accuracy metric threshold value.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
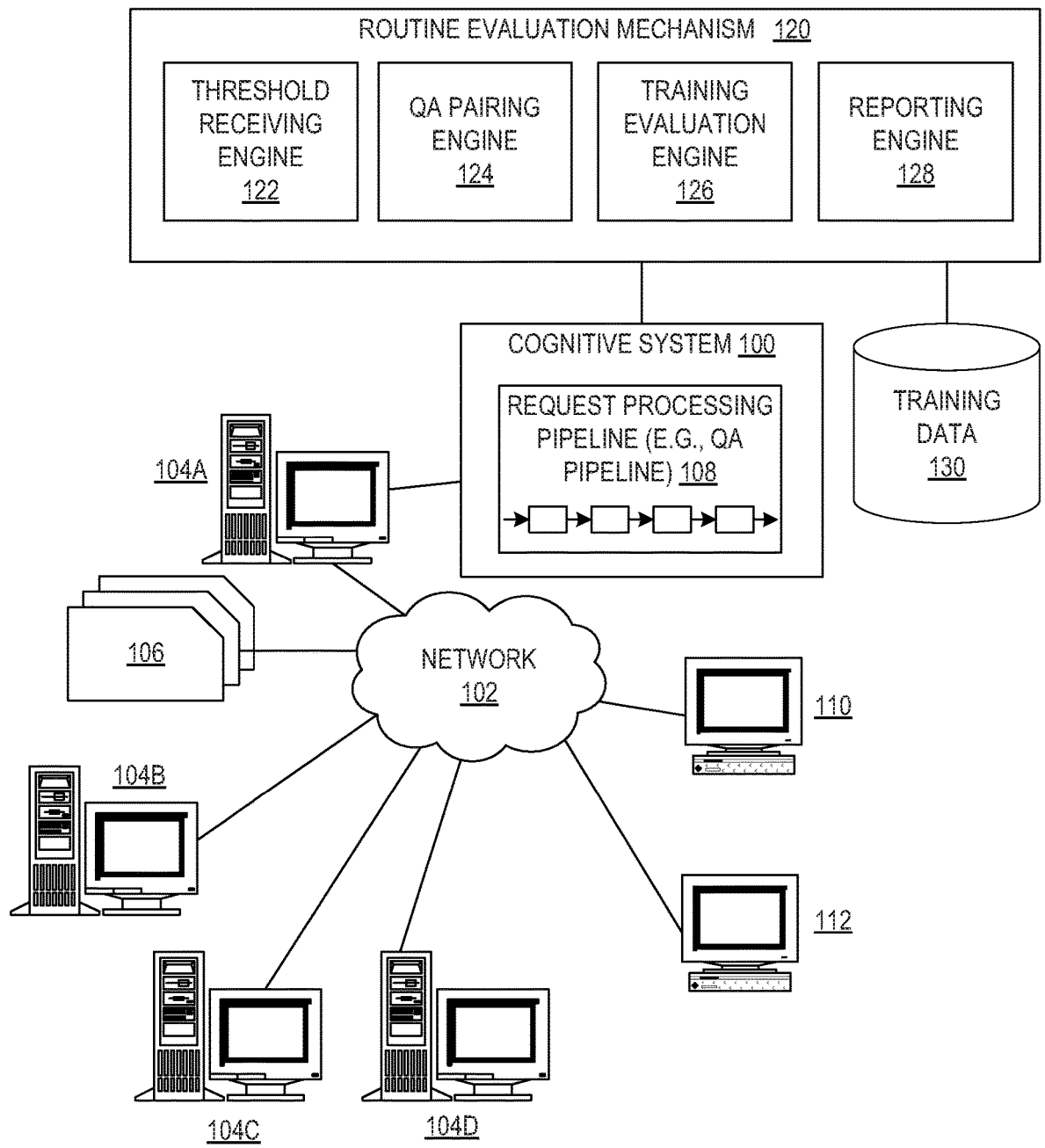
FIG. 1 depicts a schematic diagram of one illustrative embodiment of a cognitive system in a computer network.

The illustrative embodiments provide mechanisms for performing a routine evaluation of an accuracy of a factoid pipeline and staleness of associated training data.

Again, to assist with searches, recent research has been directed to generating Question and Answer (QA) systems which may take an input question, analyze it, and return results indicative of the most probable answer to the input question. QA systems provide automated mechanisms for searching through large sets of sources of content, e.g., electronic documents, and analyze them with regard to an input question to determine an answer to the question and a confidence measure as to how accurate an answer is for answering the input question. The domain adaptation and training required to produce an accurate pipeline, such as that used by QA systems, takes time and expertise. Subject matter experts (SMEs) build up large sets of question/answer (QA) pairs used to train the QA system. In many domains this training data is very specific and can often become stale with changes. For example, a corpus related to government regulations might change year to year as new officials are elected and laws are enacted. These frequent changes may affect the accuracy of the pipeline. If the pipeline becomes less accurate over time, SMEs are required to re-train the system. Therefore, an accurate method of assessing this staleness is important to keeping the system performance.

In accordance with one illustrative embodiment, mechanism are provided for solving the problem using question clustering via topic modeling in combination with regular evaluation of result snapshots. After the SMEs have completed the QA pairs, the questions are clustered together using a topic model. For each question, a snapshot is created of the accuracy metrics, the top answers, and any documents that contribute significantly to answers, thereby creating a control group. On each incremental ingestion of new data into the corpus utilized by the QA system, new accuracy metrics are generated for each question and compared to the control group. SMEs are alerted to any changes in those metrics that exceed a threshold and may view a differential report to analyze the findings.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
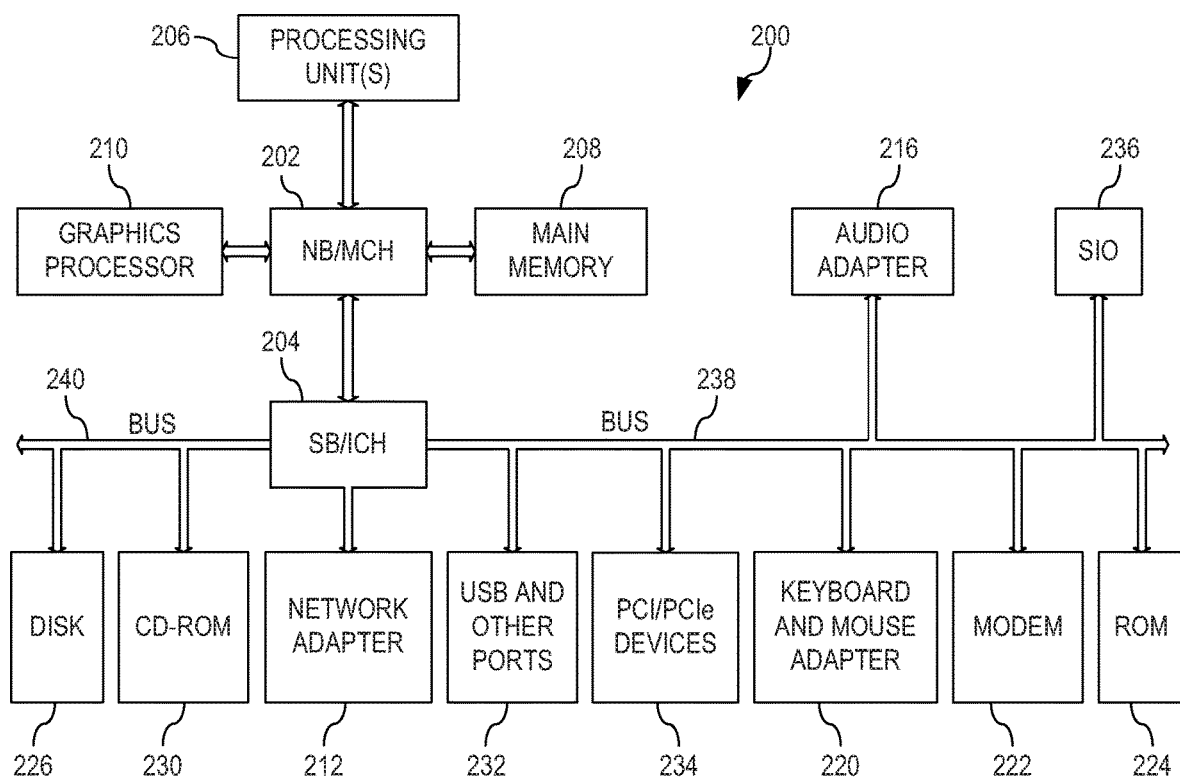
FIG. 2 is a block diagram of an example data processing system in which aspects of the illustrative embodiments are implemented.
Figure 3:
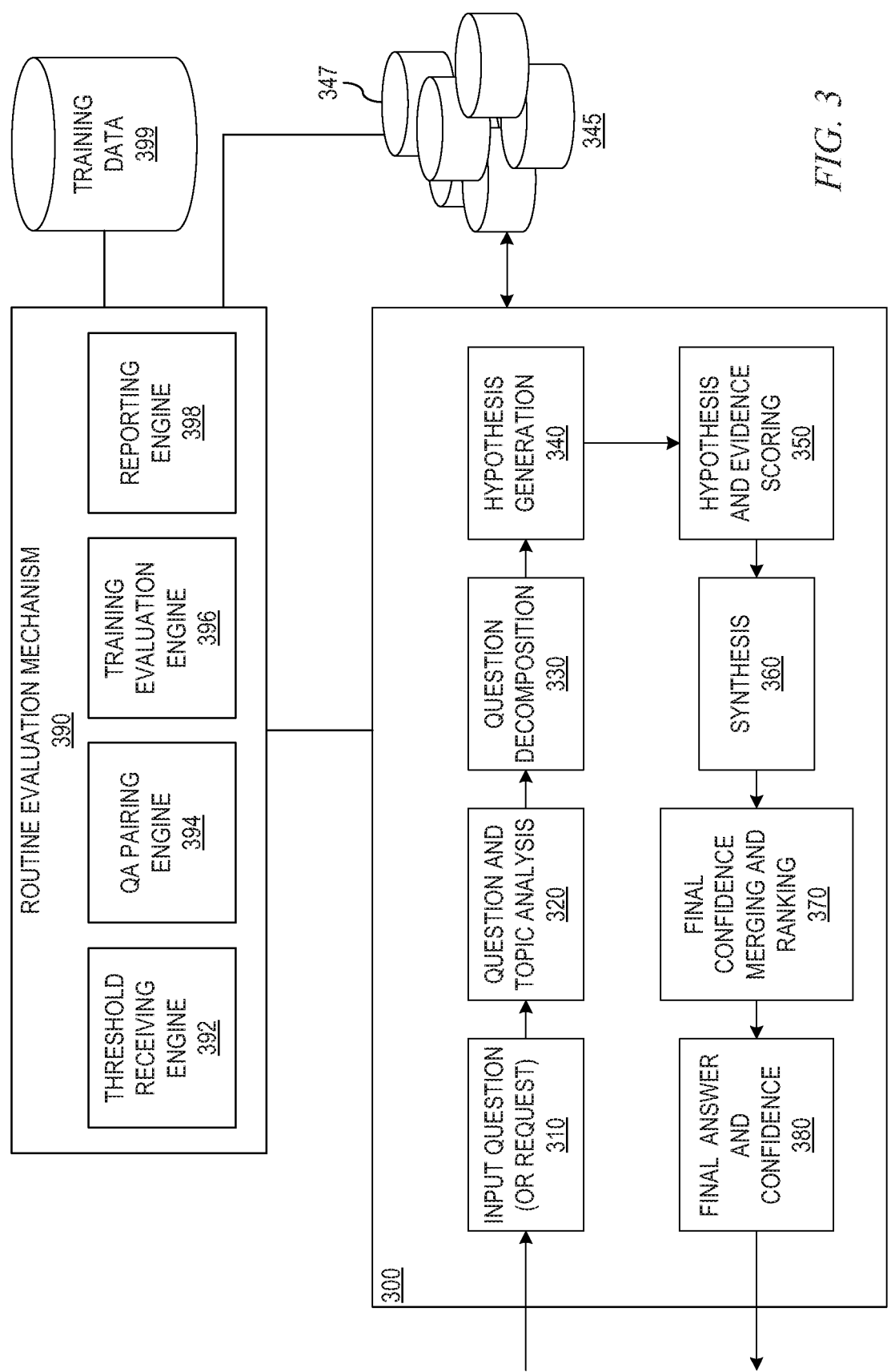
FIG. 3 illustrates a cognitive system processing pipeline for processing a natural language input to generate a response or result in accordance with one illustrative embodiment.

As noted above, the present invention provides mechanisms for routine evaluation of an accuracy of a pipeline of a QA system and a staleness of associated training data. The illustrative embodiments may be utilized in many different types of data processing environments. In order to provide a context for the description of the specific elements and functionality of the illustrative embodiments, FIGS. 1-3 are provided hereafter as example environments in which aspects of the illustrative embodiments may be implemented. It should be appreciated that FIGS. 1-3 are only examples and are not intended to assert or imply any limitation with regard to the environments in which aspects or embodiments of the present invention may be implemented. Many modifications to the depicted environments may be made without departing from the spirit and scope of the present invention.

FIGS. 1-3 are directed to describing an example cognitive system for routinely evaluating an accuracy of a request processing pipeline, such as a Question Answering (QA) pipeline (also referred to as a Question/Answer pipeline or Question and Answer pipeline) for example, request processing methodology, and request processing computer program product with which the mechanisms of the illustrative embodiments are implemented. FIGS. 1-3 are also directed to describing an example cognitive system for routinely evaluating a staleness of training data associated with the request processing pipeline. The requests submitted to the request processing pipeline may be provided as structure or unstructured request messages, natural language questions, or any other suitable format for requesting an operation to be performed by the cognitive system. As described in more detail hereafter, the particular application that is implemented in the cognitive system of the present invention is an application for routinely evaluating the accuracy of the request processing pipeline and the staleness of associated training data.

It should be appreciated that the cognitive system, while shown as having a single request processing pipeline in the examples hereafter, may in fact have multiple request processing pipelines. Each request processing pipeline may be separately trained and/or configured to process requests associated with different domains or be configured to perform the same or different analysis on input requests (or questions in implementations using a QA pipeline), depending on the desired implementation. For example, in some cases, a first request processing pipeline may be trained to operate on input requests directed to a patient diagnostics. In other cases, for example, the request processing pipelines may be configured to provide different types of cognitive functions or support different types of applications, such as one request processing pipeline being used for government regulations, tax laws, etc.

Moreover, each request processing pipeline may have their own associated corpus or corpora that they ingest and operate on, e.g., one corpus for medical maladies documents and another corpus for government regulations domain related documents in the above examples. In some cases, the request processing pipelines may each operate on the same domain of input questions but may have different configurations, e.g., different annotators or differently trained annotators, such that different analysis and potential answers are generated. The cognitive system may provide additional logic for routing input questions to the appropriate request processing pipeline, such as based on a determined domain of the input request, combining and evaluating final results generated by the processing performed by multiple request processing pipelines, and other control and interaction logic that facilitates the utilization of multiple request processing pipelines.

As noted above, one type of request processing pipeline with which the mechanisms of the illustrative embodiments may be utilized is a Question Answering (QA) pipeline. The description of example embodiments of the present invention hereafter will utilize a QA pipeline as an example of a request processing pipeline that may be augmented to include mechanisms in accordance with one or more illustrative embodiments. It should be appreciated that while the present invention will be described in the context of the cognitive system implementing one or more QA pipelines that operate on an input question, the illustrative embodiments are not limited to such. Rather, the mechanisms of the illustrative embodiments may operate on requests that are not posed as "questions" but are formatted as requests for the cognitive system to perform cognitive operations on a specified set of input data using the associated corpus or corpora and the specific configuration information used to configure the cognitive system. For example, rather than asking a natural language question of "What diagnosis applies to patient P?", the cognitive system may instead receive a request of "generate diagnosis for patient P," or the like. It should be appreciated that the mechanisms of the QA system pipeline may operate on requests in a similar manner to that of input natural language questions with minor modifications. In fact, in some cases, a request may be converted to a natural language question for processing by the QA system pipelines if desired for the particular implementation.

As will be discussed in greater detail hereafter, the illustrative embodiments may be integrated in, augment, and extend the functionality of these QA pipeline, or request processing pipeline, mechanisms of a cognitive system with regard to routinely evaluating an accuracy of a request processing pipeline and the staleness of associated training data.

Thus, it is important to first have an understanding of how cognitive systems and question and answer creation in a cognitive system implementing a QA pipeline is implemented before describing how the mechanisms of the illustrative embodiments are integrated in and augment such cognitive systems and request processing pipeline, or QA pipeline, mechanisms. It should be appreciated that the mechanisms described in FIGS. 1-3 are only examples and are not intended to state or imply any limitation with regard to the type of cognitive system mechanisms with which the illustrative embodiments are implemented. Many modifications to the example cognitive system shown in FIGS. 1-3 may be implemented in various embodiments of the present invention without departing from the spirit and scope of the present invention.

As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale. A cognitive system performs one or more computer-implemented cognitive operations that approximate a human thought process as well as enable people and machines to interact in a more natural manner so as to extend and magnify human expertise and cognition. A cognitive system comprises artificial intelligence logic, such as natural language processing (NLP) based logic, for example, and machine learning logic, which may be provided as specialized hardware, software executed on hardware, or any combination of specialized hardware and software executed on hardware. The logic of the cognitive system implements the cognitive operation(s), examples of which include, but are not limited to, question answering, identification of related concepts within different portions of content in a corpus, intelligent search algorithms, such as Internet web page searches, for example, medical diagnostic and treatment recommendations, and other types of recommendation generation, e.g., items of interest to a particular user, potential new contact recommendations, or the like.

IBM Watson™ is an example of one such cognitive system which can process human readable language and identify inferences between text passages with human-like high accuracy at speeds far faster than human beings and on a larger scale. In general, such cognitive systems are able to perform the following functions:

Navigate the complexities of human language and understanding.

Ingest and process vast amounts of structured and unstructured data.

Generate and evaluate hypothesis.

Weigh and evaluate responses that are based only on relevant evidence.

Provide situation-specific advice, insights, and guidance.

Improve knowledge and learn with each iteration and interaction through machine learning processes.

Enable decision making at the point of impact (contextual guidance).

Scale in proportion to the task.

Extend and magnify human expertise and cognition.

Identify resonating, human-like attributes and traits from natural language.

Deduce various language specific or agnostic attributes from natural language.

High degree of relevant recollection from data points (images, text, voice) (memorization and recall).

Predict and sense with situational awareness that mimic human cognition based on experiences.

Answer questions based on natural language and specific evidence.

In one aspect, cognitive systems provide mechanisms for answering questions posed to these cognitive systems using a Question Answering pipeline or system (QA system) and/or process requests which may or may not be posed as natural language questions. The QA pipeline or system is an artificial intelligence application executing on data processing hardware that answers questions pertaining to a given subject-matter domain presented in natural language. The QA pipeline receives inputs from various sources including input over a network, a corpus of electronic documents or other data, data from a content creator, information from one or more content users, and other such inputs from other possible sources of input. Data storage devices store the corpus of data. A content creator creates content in a document for use as part of a corpus of data with the QA pipeline. The document may include any file, text, article, or source of data for use in the QA system. For example, a QA pipeline accesses a body of knowledge about the domain, or subject matter area, e.g., financial domain, medical domain, legal domain, etc., where the body of knowledge (knowledgebase) can be organized in a variety of configurations, e.g., a structured repository of domain-specific information, such as ontologies, or unstructured data related to the domain, or a collection of natural language documents about the domain.

Content users input questions to cognitive system which implements the QA pipeline. The QA pipeline then answers the input questions using the content in the corpus of data by evaluating documents, sections of documents, portions of data in the corpus, or the like. When a process evaluates a given section of a document for semantic content, the process can use a variety of conventions to query such document from the QA pipeline, e.g., sending the query to the QA pipeline as a well-formed question which is then interpreted by the QA pipeline and a response is provided containing one or more answers to the question. Semantic content is content based on the relation between signifiers, such as words, phrases, signs, and symbols, and what they stand for, their denotation, or connotation. In other words, semantic content is content that interprets an expression, such as by using Natural Language Processing.

As will be described in greater detail hereafter, the QA pipeline receives an input question, parses the question to extract the major features of the question, uses the extracted features to formulate queries, and then applies those queries to the corpus of data. Based on the application of the queries to the corpus of data, the QA pipeline generates a set of hypotheses, or candidate answers to the input question, by looking across the corpus of data for portions of the corpus of data that have some potential for containing a valuable response to the input question. The QA pipeline then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, natural language analysis, lexical analysis, or the like, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA pipeline. The statistical model is used to summarize a level of confidence that the QA pipeline has regarding the evidence that the potential response, i.e. candidate answer, is inferred by the question. This process is repeated for each of the candidate answers until the QA pipeline identifies candidate answers that surface as being significantly stronger than others and thus, generates a final answer, or ranked set of answers, for the input question.

As mentioned above, QA pipeline mechanisms operate by accessing information from a corpus of data or information (also referred to as a corpus of content), analyzing it, and then generating answer results based on the analysis of this data. Accessing information from a corpus of data typically includes: a database query that answers questions about what is in a collection of structured records, and a search that delivers a collection of document links in response to a query against a collection of unstructured data (text, markup language, etc.). Conventional question answering systems are capable of generating answers based on the corpus of data and the input question, verifying answers to a collection of questions for the corpus of data, correcting errors in digital text using a corpus of data, and selecting answers to questions from a pool of potential answers, i.e. candidate answers.

Content creators, such as article authors, electronic document creators, web page authors, document database creators, and the like, determine use cases for products, solutions, and services described in such content before writing their content. Consequently, the content creators know what questions the content is intended to answer in a particular topic addressed by the content. Categorizing the questions, such as in terms of roles, types of information, tasks, or the like, associated with the question, in each document of a corpus of data allows the QA pipeline to more quickly and efficiently identify documents containing content related to a specific query. The content may also answer other questions that the content creator did not contemplate that may be useful to content users. The questions and answers may be verified by the content creator to be contained in the content for a given document. These capabilities contribute to improved accuracy, system performance, machine learning, and confidence of the QA pipeline. Content creators, automated tools, or the like, annotate or otherwise generate metadata for providing information useable by the QA pipeline to identify these questions and answer attributes of the content.

Operating on such content, the QA pipeline generates answers for input questions using a plurality of intensive analysis mechanisms which evaluate the content to identify the most probable answers, i.e. candidate answers, for the input question. The most probable answers are output as a ranked listing of candidate answers ranked according to their relative scores or confidence measures calculated during evaluation of the candidate answers, as a single final answer having a highest ranking score or confidence measure, or which is a best match to the input question, or a combination of ranked listing and final answer.

FIG. 1 depicts a schematic diagram of one illustrative embodiment of a cognitive system 100 implementing a request processing pipeline 108, which in some embodiments may be a question answering (QA) pipeline, in a computer network 102. For purposes of the present description, it will be assumed that the request processing pipeline 108 is implemented as a QA pipeline that operates on structured and/or unstructured requests in the form of input questions. One example of a question processing operation which may be used in conjunction with the principles described herein is described in U.S. Patent Application Publication No. 2011/0125734, which is herein incorporated by reference in its entirety. The cognitive system 100 is implemented on one or more computing devices 104A-D (comprising one or more processors and one or more memories, and potentially any other computing device elements generally known in the art including buses, storage devices, communication interfaces, and the like) connected to the computer network 102. For purposes of illustration only, FIG. 1 depicts the cognitive system 100 being implemented on computing device 104A only, but as noted above the cognitive system 100 may be distributed across multiple computing devices, such as a plurality of computing devices 104A-D. The network 102 includes multiple computing devices 104A-D, which may operate as server computing devices, and 110-112 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 100 and network 102 enables question processing and answer generation (QA) functionality for one or more cognitive system users via their respective computing devices 110-112. In other embodiments, the cognitive system 100 and network 102 may provide other types of cognitive operations including, but not limited to, request processing and cognitive response generation which may take many different forms depending upon the desired implementation, e.g., cognitive information retrieval, training/instruction of users, cognitive evaluation of data, or the like. Other embodiments of the cognitive system 100 may be used with components, systems, subsystems, and/or devices other than those that are depicted herein.

The cognitive system 100 is configured to implement a request processing pipeline 108 that receive inputs from various sources. The requests may be posed in the form of a natural language question, natural language request for information, natural language request for the performance of a cognitive operation, or the like. For example, the cognitive system 100 receives input from the network 102, a corpus or corpora of electronic documents 106, cognitive system users, and/or other data and other possible sources of input. In one embodiment, some or all of the inputs to the cognitive system 100 are routed through the network 102. The various computing devices 104A-D on the network 102 include access points for content creators and cognitive system users. Some of the computing devices 104A-D includes devices for a database storing the corpus or corpora of data 106 (which is shown as a separate entity in FIG. 1 for illustrative purposes only). Portions of the corpus or corpora of data 106 may also be provided on one or more other network attached storage devices, in one or more databases, or other computing devices not explicitly shown in FIG. 1. The network 102 includes local network connections and remote connections in various embodiments, such that the cognitive system 100 may operate in environments of any size, including local and global, e.g., the Internet.

In one embodiment, the content creator creates content in a document of the corpus or corpora of data 106 for use as part of a corpus of data with the cognitive system 100. The document includes any file, text, article, or source of data for use in the cognitive system 100. Cognitive system users access the cognitive system 100 via a network connection or an Internet connection to the network 102, and input questions/requests to the cognitive system 100 that are answered/processed based on the content in the corpus or corpora of data 106. In one embodiment, the questions/requests are formed using natural language. The cognitive system 100 parses and interprets the question/request via a pipeline 108, and provides a response to the cognitive system user, e.g., cognitive system user 110, containing one or more answers to the question posed, response to the request, results of processing the request, or the like. In some embodiments, the cognitive system 100 provides a response to users in a ranked list of candidate answers/responses while in other illustrative embodiments, the cognitive system 100 provides a single final answer/response or a combination of a final answer/response and ranked listing of other candidate answers/responses.

The cognitive system 100 implements the pipeline 108 which comprises a plurality of stages for processing an input question/request based on information obtained from the corpus or corpora of data 106. The pipeline 108 generates answers/responses for the input question or request based on the processing of the input question/request and the corpus or corpora of data 106. The pipeline 108 will be described in greater detail hereafter with regard to FIG. 3.

In some illustrative embodiments, the cognitive system 100 may be the IBM Watson™ cognitive system available from International Business Machines Corporation of Armonk, N.Y., which is augmented with the mechanisms of the illustrative embodiments described hereafter. As outlined previously, a pipeline of the IBM Watson™ cognitive system receives an input question or request which it then parses to extract the major features of the question/request, which in turn are then used to formulate queries that are applied to the corpus or corpora of data 106. Based on the application of the queries to the corpus or corpora of data 106, a set of hypotheses, or candidate answers/responses to the input question/request, are generated by looking across the corpus or corpora of data 106 for portions of the corpus or corpora of data 106 (hereafter referred to simply as the corpus 106) that have some potential for containing a valuable response to the input question/response (hereafter assumed to be an input question). The pipeline 108 of the IBM Watson™ cognitive system then performs deep analysis on the language of the input question and the language used in each of the portions of the corpus 106 found during the application of the queries using a variety of reasoning algorithms.

The scores obtained from the various reasoning algorithms are then weighted against a statistical model that summarizes a level of confidence that the pipeline 108 of the IBM Watson™ cognitive system 100, in this example, has regarding the evidence that the potential candidate answer is inferred by the question. This process is be repeated for each of the candidate answers to generate ranked listing of candidate answers which may then be presented to the user that submitted the input question, e.g., a user of client computing device 110, or from which a final answer is selected and presented to the user. More information about the pipeline 108 of the IBM Watson™ cognitive system 100 may be obtained, for example, from the IBM Corporation website, IBM Redbooks, and the like. For example, information about the pipeline of the IBM Watson™ cognitive system can be found in Yuan et al., "Watson and Healthcare," IBM developerWorks, 2011 and "The Era of Cognitive Systems: An Inside Look at IBM Watson and How it Works" by Rob High, IBM Redbooks, 2012.

As noted above, while the input to the cognitive system 100 from a client device may be posed in the form of a natural language question, the illustrative embodiments are not limited to such. Rather, the input question may in fact be formatted or structured as any suitable type of request which may be parsed and analyzed using structured and/or unstructured input analysis, including but not limited to the natural language parsing and analysis mechanisms of a cognitive system such as IBM Watson™, to determine the basis upon which to perform cognitive analysis and providing a result of the cognitive analysis. In the case of a healthcare based cognitive system, this analysis may involve processing patient medical records, medical guidance documentation from one or more corpora, and the like, to provide a healthcare oriented cognitive system result.

In the context of the present invention, cognitive system 100 may provide a cognitive functionality for routinely evaluating an accuracy of request processing pipeline 108 and a staleness training data used for training request processing pipeline 106. For example, depending upon the particular implementation, the government regulations, healthcare, automated learning, knowledge base expansion, etc. based operations may comprise elected officials, current laws, or the like, as well as patient diagnostics, medical treatment recommendation systems, medical practice management systems, personal patient care plan generation and monitoring, patient electronic medical record (EMR) evaluation for various purposes, such as for identifying patients that are suitable for a medical trial or a particular type of medical treatment, or the like. Thus, the cognitive system 100 may operates in political domains, law domain, medical or healthcare type domains, etc., which may process requests for such operations via the request processing pipeline 108 input as either structured or unstructured requests, natural language input questions, or the like". In one illustrative embodiment, the cognitive system 100 is a medical treatment recommendation system that analyzes a patient's EMRs in relation to medical guidelines and other medical documentation in a corpus of information to generate a recommendation as to how to treat a medical malady or condition of the patient.

As shown in FIG. 1, the cognitive system 100 is further augmented, in accordance with the mechanisms of the illustrative embodiments, to include logic implemented in specialized hardware, software executed on hardware, or any combination of specialized hardware and software executed on hardware, for implementing a routine evaluation the accuracy of request processing pipeline 108 and the staleness of associated training data. Routine evaluation mechanism 120 comprises threshold receiving engine 122, QA pairing engine 124, training evaluation engine 126, and reporting engine 128. Initially, threshold receiving engine 122 receives an accuracy metric threshold value for changes in accuracy metrics of request processing pipeline 108. Threshold receiving engine 122 also receives a document contribution threshold value for consideration of documents in corpus 106 and their individual contribution to the confidence of a particular answer. As each answer occurrence is associated with one or more documents, a document contribution value is generated from the feature values associated with the answer occurrence from that document and the document contribution threshold value is utilized to cull those answers and associated documents that are below the document contribution threshold value.

In an initial training of request processing pipeline 108, QA pairing engine 124 receives a list of QA training pairs for training of request processing pipeline 108. The QA training pairs are normally received from subject matter experts of the subject that is to be processed by request processing pipeline 108. Training evaluation engine 126 runs each question from the list of QA training pairs through request processing pipeline 108, which, as discussed previously, produces a list of answers, supporting documents, and accuracy metrics. For each provided answer, training evaluation engine 126 determines whether the document contribution value associated with the answer is equal to or above the document contribution threshold value. For answers whose document contribution value associated with the answer is equal to or above the document contribution threshold value, training evaluation engine 126 stores a snapshot of the top answers, highly-contributing supporting documents, and accuracy metrics in training data 130.

Training evaluation engine 126 further clusters together the questions from the list of QA pairs using topic modeling. To cluster the questions using topic modeling, training evaluation engine 126 may use the questions themselves, documents returned from the search, or both. In accordance with one illustrative embodiment, topic modeling is the process of organizing questions based on their topic. For example, training evaluation engine 126 may train a topic model on two sets of news articles, one which consists entirely of sports reporting and another which consists entirely of political reporting. Then, provided a previously unseen news article, the topic models are used to evaluate the new model and determine whether this previously unseen news article is a sports article or a political article. This may be done using a variety of methods, including a Naive Bayes unigram model, a maximum entropy model, a latent semantic model, or the like. Based on the clustering, for each question cluster, training evaluation engine 126 determines an average of the accuracy metrics across the questions using the accuracy metrics associated with the answers stored in training data 130.

With request processing pipeline 108 initially trained, then on each incremental ingestion of new documents and/or additional QA training pairs, training evaluation engine 126 runs each question from the list of QA training pairs through request processing pipeline 108, thereby producing a new list of answers, supporting documents, and new accuracy metrics. Utilizing the document contribution threshold value, training evaluation engine 126 stores a new snapshot of the new top answers, highly-contributing supporting documents, and accuracy metrics in training data 130. Training evaluation engine 126 clusters together the questions from the list of QA pairs using topic modeling and determines an average of the accuracy metrics across the questions using the new accuracy metrics associated with the answers stored in training data 130. For each cluster of questions, training evaluation engine 126 then compares the average accuracy metric from the initial snapshot to the new average accuracy metric due to the incremental ingestion of new documents and/or additional QA training pairs in the new snapshot. If an accuracy metric delta identified in the comparison exceeds the accuracy metric threshold value, report engine 128 generates a differential report between the initial snapshot and the new snapshot, which may then be sent to a subject matter expert (SME) indicating a review is needed of the training of request processing pipeline 108.

In accordance with one illustrative embodiment, the initial training snapshot may be considered a control snapshot and, at each incremental ingestion of new documents and/or additional QA training pairs, a new snapshot would be generated. Thus, the SME would have the ability to look at a trend graph of all snapshots to evaluate loss in accuracy over time. Based on the reporting of changes in accuracy metrics, routine evaluation mechanism 120 may implement a culling of documents within corpus 106 and/or an updating of QA pairs for which request processing pipeline 108 is trained in order to improve the accuracy of request processing pipeline 108. The culling of documents in corpus 106 and/or an updating of QA pairs for which request processing pipeline 108 may be done automatically by routine evaluation mechanism 120 or based on an indication from an SME subsequent to a review of the differential report generated by report engine 128. In either instance the accuracy of request processing pipeline 108 is improved over time by assessing the staleness of request processing pipeline 108 to keeping the system performance optimal.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 2 is provided as an example of one type of data processing system in which aspects of the present invention may be implemented. Many other types of data processing systems may be likewise configured to specifically implement the mechanisms of the illustrative embodiments.

FIG. 2 is a block diagram of an example data processing system in which aspects of the illustrative embodiments are implemented. Data processing system 200 is an example of a computer, such as server 104 or client 110 in FIG. 1, in which computer usable code or instructions implementing the processes for illustrative embodiments of the present invention are located. In one illustrative embodiment, FIG. 2 represents a server computing device, such as a server 104, which, which implements a cognitive system 100 and QA system pipeline 108 augmented to include the additional mechanisms of the illustrative embodiments described hereafter.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 is connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 is connected to SB/ICH 204.

An operating system runs on processing unit 206. The operating system coordinates and provides control of various components within the data processing system 200 in FIG. 2. As a client, the operating system is a commercially available operating system such as Microsoft® Windows 8®. An object-oriented programming system, such as the Java™ programming system, may run in conjunction with the operating system and provides calls to the operating system from Java™ programs or applications executing on data processing system 200.

As a server, data processing system 200 may be, for example, an IBM™ eServer™ System p® computer system, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and are loaded into main memory 208 for execution by processing unit 206. The processes for illustrative embodiments of the present invention are performed by processing unit 206 using computer usable program code, which is located in a memory such as, for example, main memory 208, ROM 224, or in one or more peripheral devices 226 and 230, for example.

A bus system, such as bus 238 or bus 240 as shown in FIG. 2, is comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, includes one or more devices used to transmit and receive data. A memory may be, for example, main memory 208, ROM 224, or a cache such as found in NB/MCH 202 in FIG. 2.

Those of ordinary skill in the art will appreciate that the hardware depicted in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 illustrates an example of a cognitive system processing pipeline which, in the depicted example, is a question and answer (QA) system pipeline used to process an input question in accordance with one illustrative embodiment. As noted above, the cognitive systems with which the illustrative embodiments may be utilized are not limited to QA systems and thus, not limited to the use of a QA system pipeline. FIG. 3 is provided only as one example of the processing structure that may be implemented to process a natural language input requesting the operation of a cognitive system to present a response or result to the natural language input.

The QA system pipeline of FIG. 3 may be implemented, for example, as request processing pipeline 108 of cognitive system 100 in FIG. 1. It should be appreciated that the stages of the QA pipeline shown in FIG. 3 are implemented as one or more software engines, components, or the like, which are configured with logic for implementing the functionality attributed to the particular stage. Each stage is implemented using one or more of such software engines, components or the like. The software engines, components, etc. are executed on one or more processors of one or more data processing systems or devices and utilize or operate on data stored in one or more data storage devices, memories, or the like, on one or more of the data processing systems. The QA pipeline of FIG. 3 is augmented, for example, in one or more of the stages to implement the improved mechanism of the illustrative embodiments described hereafter, additional stages may be provided to implement the improved mechanism, or separate logic from QA pipeline 300 may be provided for interfacing with QA pipeline 300 and implementing the improved functionality and operations of the illustrative embodiments.

As shown in FIG. 3, QA pipeline 300 comprises a plurality of stages 310-380 through which the cognitive system operates to analyze an input question and generate a final response. In an initial question input stage 310, QA pipeline 300 receives an input question that is presented in a natural language format. That is, a user inputs, via a user interface, an input question for which the user wishes to obtain an answer, e.g., "Who are Washington's closest advisors?" In response to receiving the input question, the next stage of QA pipeline 300, i.e. the question and topic analysis stage 320, parses the input question using natural language processing (NLP) techniques to extract major features from the input question, and classify the major features according to types, e.g., names, dates, or any of a plethora of other defined topics. For example, in the example question above, the term "who" may be associated with a topic for "persons" indicating that the identity of a person is being sought, "Washington" may be identified as a proper name of a person with which the question is associated, "closest" may be identified as a word indicative of proximity or relationship, and "advisors" may be indicative of a noun or other language topic.

In addition, the extracted major features include key words and phrases classified into question characteristics, such as the focus of the question, the lexical answer type (LAT) of the question, and the like. As referred to herein, a lexical answer type (LAT) is a word in, or a word inferred from, the input question that indicates the type of the answer, independent of assigning semantics to that word. For example, in the question "What maneuver was invented in the 1500s to speed up the game and involves two pieces of the same color?," the LAT is the string "maneuver." The focus of a question is the part of the question that, if replaced by the answer, makes the question a standalone statement. For example, in the question "What drug has been shown to relieve the symptoms of ADD with relatively few side effects?, "the focus is" drug" since if this word were replaced with the answer, e.g., the answer "Adderall" can be used to replace the term "drug" to generate the sentence "Adderall has been shown to relieve the symptoms of ADD with relatively few side effects." The focus often, but not always, contains the LAT. On the other hand, in many cases it is not possible to infer a meaningful LAT from the focus.

Referring again to FIG. 3, the identified major features are then used during the question decomposition stage 330 to decompose the question into one or more queries that are applied to the corpora of data/information 345 in order to generate one or more hypotheses. The queries are generated in any known or later developed query language, such as the Structure Query Language (SQL), or the like. The queries are applied to one or more databases storing information about the electronic texts, documents, articles, websites, and the like, that make up the corpora of data/information 345. That is, these various sources themselves, different collections of sources, and the like, represent a different corpus 347 within the corpora 345. There may be different corpora 347 defined for different collections of documents based on various criteria depending upon the particular implementation. For example, different corpora may be established for different topics, subject matter categories, sources of information, or the like. As one example, a first corpus may be associated with healthcare documents while a second corpus may be associated with financial documents. Alternatively, one corpus may be documents published by the U.S. Department of Energy while another corpus may be IBM Redbooks documents. Any collection of content having some similar attribute may be considered to be a corpus 347 within the corpora 345.

The queries are applied to one or more databases storing information about the electronic texts, documents, articles, websites, and the like, that make up the corpus of data/information, e.g., the corpus of data 106 in FIG. 1. The queries are applied to the corpus of data/information at the hypothesis generation stage 340 to generate results identifying potential hypotheses for answering the input question, which can then be evaluated. That is, the application of the queries results in the extraction of portions of the corpus of data/information matching the criteria of the particular query. These portions of the corpus are then analyzed and used, during the hypothesis generation stage 340, to generate hypotheses for answering the input question. These hypotheses are also referred to herein as "candidate answers" for the input question. For any input question, at this stage 340, there may be hundreds of hypotheses or candidate answers generated that may need to be evaluated.

QA pipeline 300, in stage 350, then performs a deep analysis and comparison of the language of the input question and the language of each hypothesis or "candidate answer," as well as performs evidence scoring to evaluate the likelihood that the particular hypothesis is a correct answer for the input question. As mentioned above, this involves using a plurality of reasoning algorithms, each performing a separate type of analysis of the language of the input question and/or content of the corpus that provides evidence in support of, or not in support of, the hypothesis. Each reasoning algorithm generates a score based on the analysis it performs which indicates a measure of relevance of the individual portions of the corpus of data/information extracted by application of the queries as well as a measure of the correctness of the corresponding hypothesis, i.e. a measure of confidence in the hypothesis. There are various ways of generating such scores depending upon the particular analysis being performed. In generally, however, these algorithms look for particular terms, phrases, or patterns of text that are indicative of terms, phrases, or patterns of interest and determine a degree of matching with higher degrees of matching being given relatively higher scores than lower degrees of matching.

Thus, for example, an algorithm may be configured to look for the exact term from an input question or synonyms to that term in the input question, e.g., the exact term or synonyms for the term "movie," and generate a score based on a frequency of use of these exact terms or synonyms. In such a case, exact matches will be given the highest scores, while synonyms may be given lower scores based on a relative ranking of the synonyms as may be specified by a subject matter expert (person with knowledge of the particular domain and terminology used) or automatically determined from frequency of use of the synonym in the corpus corresponding to the domain. Thus, for example, an exact match of the term "movie" in content of the corpus (also referred to as evidence, or evidence passages) is given a highest score. A synonym of movie, such as "motion picture" may be given a lower score but still higher than a synonym of the type "film" or "moving picture show." Instances of the exact matches and synonyms for each evidence passage may be compiled and used in a quantitative function to generate a score for the degree of matching of the evidence passage to the input question.

Thus, for example, a hypothesis or candidate answer to the input question of "What was the first movie?" is "The Horse in Motion." If the evidence passage contains the statements "The first motion picture ever made was 'The Horse in Motion' in 1878 by Eadweard Muybridge. It was a movie of a horse running," and the algorithm is looking for exact matches or synonyms to the focus of the input question, i.e. "movie," then an exact match of "movie" is found in the second sentence of the evidence passage and a highly scored synonym to "movie," i.e. "motion picture," is found in the first sentence of the evidence passage. This may be combined with further analysis of the evidence passage to identify that the text of the candidate answer is present in the evidence passage as well, i.e. "The Horse in Motion." These factors may be combined to give this evidence passage a relatively high score as supporting evidence for the candidate answer "The Horse in Motion" being a correct answer.

It should be appreciated that this is just one simple example of how scoring can be performed. Many other algorithms of various complexities may be used to generate scores for candidate answers and evidence without departing from the spirit and scope of the present invention.

In the synthesis stage 360, the large numbers of scores generated by the various reasoning algorithms are synthesized into confidence scores or confidence measures for the various hypotheses. This process involves applying weights to the various scores, where the weights have been determined through training of the statistical model employed by QA pipeline 300 and/or dynamically updated. For example, the weights for scores generated by algorithms that identify exactly matching terms and synonym may be set relatively higher than other algorithms that are evaluating publication dates for evidence passages. The weights themselves may be specified by subject matter experts or learned through machine learning processes that evaluate the significance of characteristics evidence passages and their relative importance to overall candidate answer generation.

The weighted scores are processed in accordance with a statistical model generated through training of QA pipeline 300 that identifies a manner by which these scores may be combined to generate a confidence score or measure for the individual hypotheses or candidate answers. This confidence score or measure summarizes the level of confidence that QA pipeline 300 has about the evidence that the candidate answer is inferred by the input question, i.e. that the candidate answer is the correct answer for the input question.

The resulting confidence scores or measures are processed by a final confidence merging and ranking stage 370 which compares the confidence scores and measures to each other, compares them against predetermined thresholds, or performs any other analysis on the confidence scores to determine which hypotheses/candidate answers are the most likely to be the correct answer to the input question. The hypotheses/candidate answers are ranked according to these comparisons to generate a ranked listing of hypotheses/candidate answers (hereafter simply referred to as "candidate answers"). From the ranked listing of candidate answers, at stage 380, a final answer and confidence score, or final set of candidate answers and confidence scores, are generated and output to the submitter of the original input question via a graphical user interface or other mechanism for outputting information.

As shown in FIG. 3, in accordance with one illustrative embodiment, routine evaluation mechanism 390 is implemented to train and perform a routine evaluation the accuracy of QA pipeline 300 and the staleness of associated training data in corpora 345. Routine evaluation mechanism 390 comprises threshold receiving engine 392, QA pairing engine 394, training evaluation engine 396, and reporting engine 398. Initially, threshold receiving engine 392 receives an accuracy metric threshold value for changes in accuracy metrics of QA pipeline 300. Threshold receiving engine 392 also receives a document contribution threshold value for consideration of documents in corpora 345 and their individual contribution to the confidence of a particular answer. As each answer occurrence is associated with one or more documents, a document contribution value is generated from the feature values associated with the answer occurrence from that document and the document contribution threshold value is utilized to cull those answers and associated documents that are below the document contribution threshold value.

In an initial training of QA pipeline 300, QA pairing engine 394 receives a list of QA training pairs for training of QA pipeline 300. The QA training pairs are normally received from subject matter experts of the subject that is to be processed by QA pipeline 300. Training evaluation engine 396 runs each question from the list of QA training pairs through QA pipeline 300, which, as discussed previously, produces a list of answers, supporting documents, and accuracy metrics. For each provided answer, training evaluation engine 396 determines whether the document contribution value associated with the answer is equal to or above the document contribution threshold value. For answers whose document contribution value associated with the answer is equal to or above the document contribution threshold value, training evaluation engine 396 stores a snapshot of the top answers, highly-contributing supporting documents, and accuracy metrics in training data 399.

Training evaluation engine 396 further clusters together the questions from the list of QA pairs using topic modeling. To cluster the questions using topic modeling, training evaluation engine 396 may use the questions themselves, documents returned from the search, or both. In accordance with one illustrative embodiment, topic modeling is the process of organizing questions based on their topic. For example, training evaluation engine 396 may train a topic model on two sets of news articles, one which consists entirely of sports reporting and another which consists entirely of political reporting. Then, provided a previously unseen news article, the topic models are used to evaluate the new model and determine whether this previously unseen news article is a sports article or a political article. This may be done using a variety of methods, including a Naive Bayes unigram model, a maximum entropy model, a latent semantic model, or the like. Based on the clustering, for each question cluster, training evaluation engine 396 determines an average of the accuracy metrics across the questions using the accuracy metrics associated with the answers stored in training data 399.

With QA pipeline 300 initially trained, then on each incremental ingestion of new documents and/or additional QA training pairs, training evaluation engine 396 runs each question from the list of QA training pairs through QA pipeline 300, thereby producing a new list of answers, supporting documents, and new accuracy metrics. Utilizing the document contribution threshold value, training evaluation engine 396 stores a new snapshot of the new top answers, highly-contributing supporting documents, and accuracy metrics in training data 399. Training evaluation engine 396 clusters together the questions from the list of QA pairs using topic modeling and determines an average of the accuracy metrics across the questions using the new accuracy metrics associated with the answers stored in training data 399. For each cluster of questions, training evaluation engine 396 then compares the average accuracy metric from the initial snapshot to the new average accuracy metric due to the incremental ingestion of new documents and/or additional QA training pairs in the new snapshot. If an accuracy metric delta identified in the comparison exceeds the accuracy metric threshold value, report engine 398 generates a differential report between the initial snapshot and the new snapshot, which may then be sent to a subject matter expert (SME) indicating a review is needed of the training of QA pipeline 300.

In accordance with one illustrative embodiment, the initial training snapshot may be considered a control snapshot and, at each incremental ingestion of new documents and/or additional QA training pairs, a new snapshot would be generated. Thus, the SME would have the ability to look at a trend graph of all snapshots to evaluate loss in accuracy over time. Based on the reporting of changes in accuracy metrics, routine evaluation mechanism 390 may implement a culling of documents within corpora 345 and/or an updating of QA pairs for which QA pipeline 300 is trained in order to improve the accuracy of QA pipeline 300. The culling of documents in corpora 345 and/or an updating of QA pairs for which QA pipeline 300 may be done automatically by routine evaluation mechanism 390 or based on an indication from an SME subsequent to a review of the differential report generated by report engine 398. In either instance the accuracy of QA pipeline 300 is improved over time by assessing the staleness of QA pipeline 300 to keeping the system performance optimal.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 4:
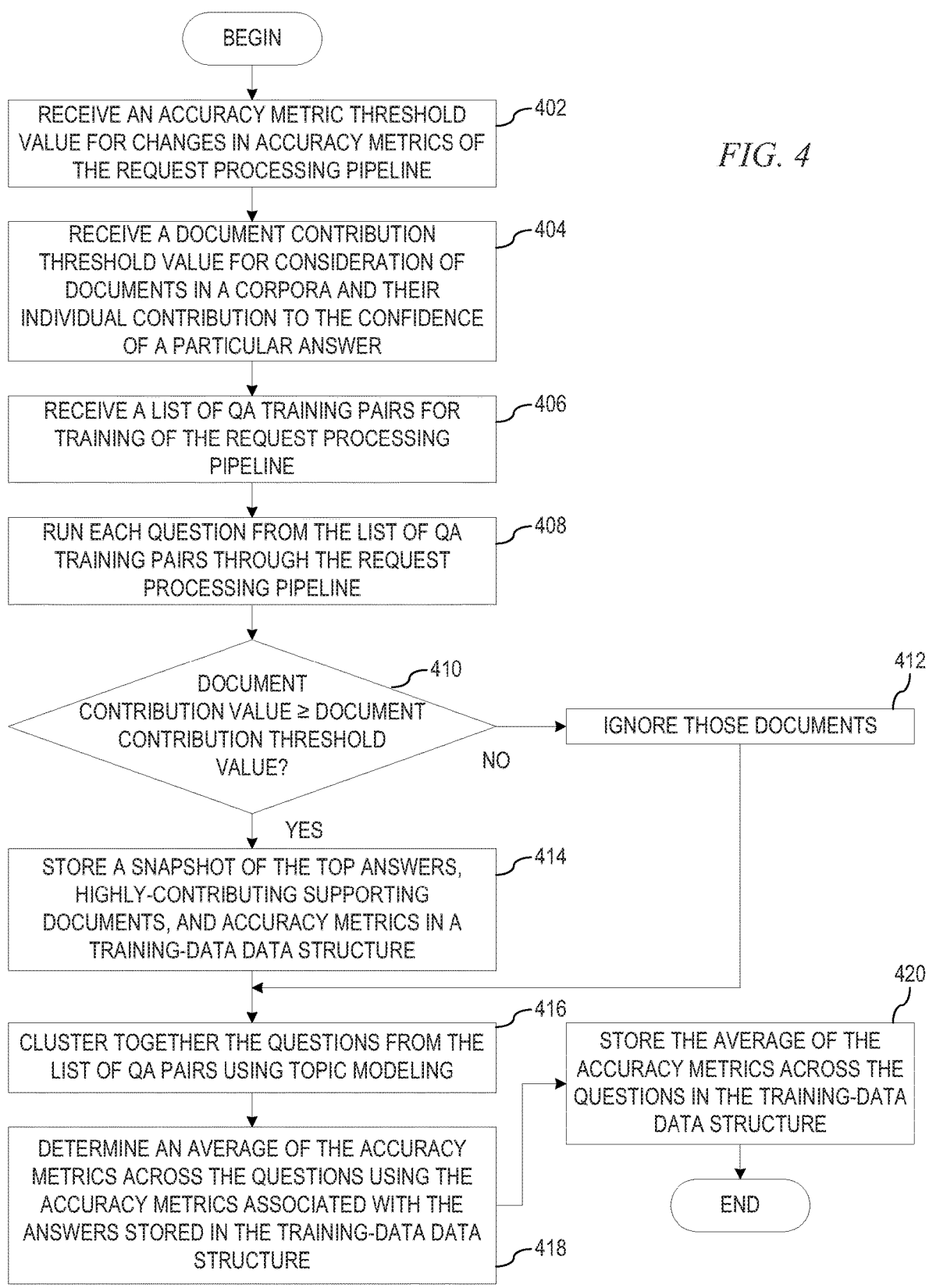
FIG. 4 depicts an exemplary flowchart of operations performed by the routine evaluation mechanism in training a request processing pipeline in accordance with an illustrative embodiment.

FIG. 4 depicts an exemplary flowchart of operations performed by the routine evaluation mechanism in training a request processing pipeline in accordance with an illustrative embodiment. As the operation begins, the routine evaluation mechanism receives an accuracy metric threshold value for changes in accuracy metrics of the request processing pipeline (step 402). The routine evaluation mechanism also receives a document contribution threshold value for consideration of documents in a corpora and their individual contribution to the confidence of a particular answer (step 404). The routine evaluation mechanism receives a list of QA training pairs for training of the request processing pipeline (step 406). The routine evaluation mechanism runs each question from the list of QA training pairs through the request processing pipeline (step 408) so as to produce a list of answers, supporting documents, and accuracy metrics. For each provided answer, the routine evaluation mechanism determines whether the document contribution value associated with the answer is equal to or above the document contribution threshold value (step 410). At step 410, for those documents with a document contribution value associated with the answer that is below the document contribution threshold value, the routine evaluation mechanism ignores those documents (step 412).

At step 410, for those documents with a document contribution value associated with the answer that is equal to or above the document contribution threshold value, the routine evaluation mechanism stores a snapshot of the top answers, highly-contributing supporting documents, and accuracy metrics in a training-data data structure (step 414). The routine evaluation mechanism then clusters together the questions from the list of QA pairs using topic modeling (step 416). Based on the clustering, for each question cluster, the routine evaluation mechanism determines an average of the accuracy metrics across the questions using the accuracy metrics associated with the answers stored in the training-data data structure (step 418). The routine evaluation mechanism stores the average of the accuracy metrics across the questions in the training-data data structure (step 420), with the operation ending thereafter.

Figure 5:
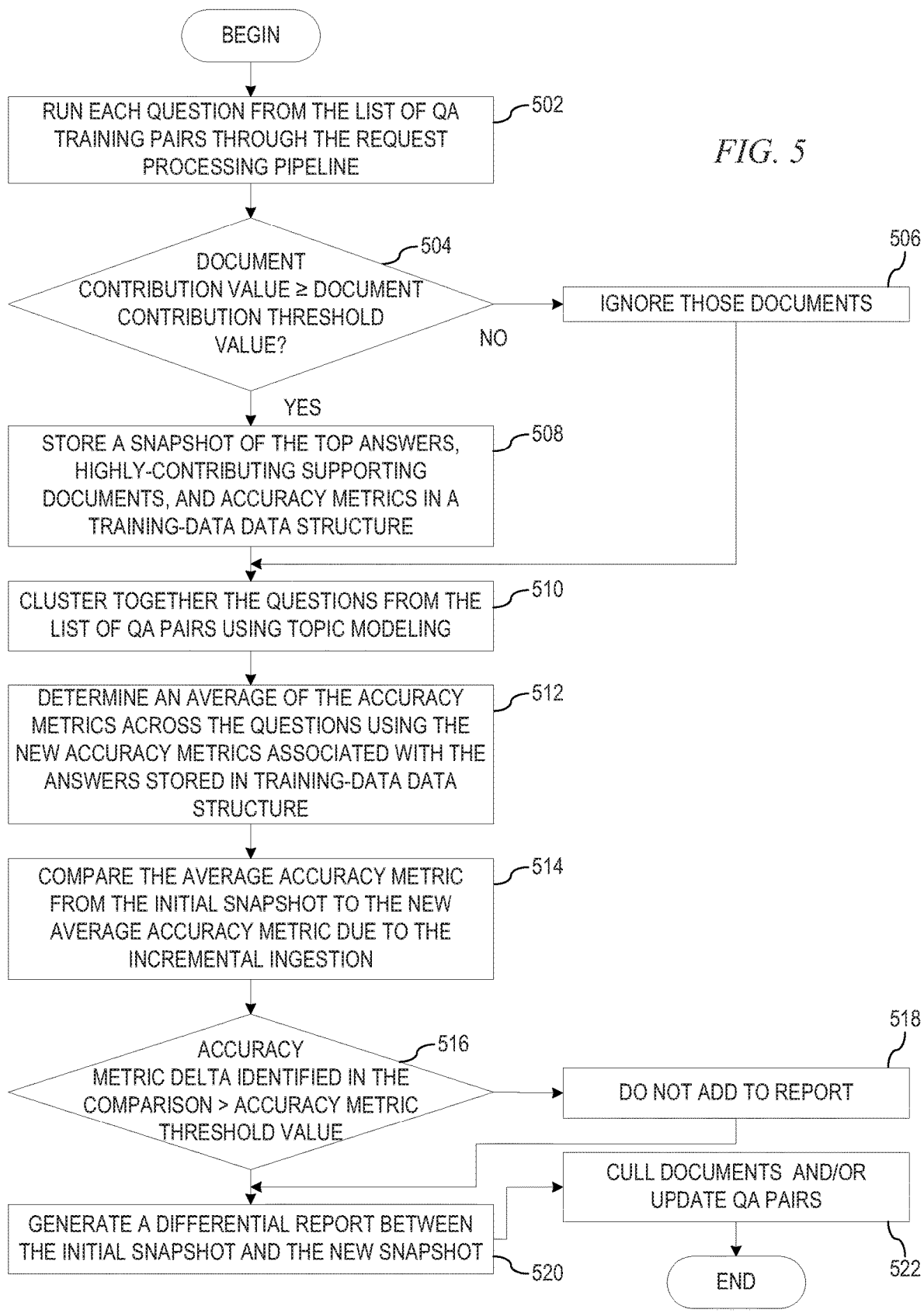
FIG. 5 depicts an exemplary flowchart of operations performed by the routine evaluation mechanism in perform a routine evaluation the accuracy of a request processing pipeline and the staleness of associated training data in accordance with an illustrative embodiment.

FIG. 5 depicts an exemplary flowchart of operations performed by the routine evaluation mechanism in perform a routine evaluation the accuracy of a request processing pipeline and the staleness of associated training data in accordance with an illustrative embodiment. As the operation begins, on each incremental ingestion of new documents and/or additional QA training pairs, the routine evaluation mechanism runs each question from the list of QA training pairs through the request processing pipeline (step 502), thereby producing a new list of answers, supporting documents, and new accuracy metrics. For each new answer, the routine evaluation mechanism determines whether the document contribution value associated with the answer is equal to or above the document contribution threshold value (step 504). At step 504, for those documents with a document contribution value associated with the answer that is below the document contribution threshold value, those documents are ignored (step 506).

At step 504, for those documents with a document contribution value associated with the answer that is equal to or above the document contribution threshold value, the routine evaluation mechanism stores a new snapshot of the new top answers, highly-contributing supporting documents, and accuracy metrics in a training-data data structure (step 508). The routine evaluation mechanism then clusters together the questions from the list of QA pairs using topic modeling (step 510). Based on the clustering, for each question cluster, the routine evaluation mechanism determines an average of the accuracy metrics across the questions using the new accuracy metrics associated with the answers stored in training-data data structure (step 512). For each cluster of questions, the routine evaluation mechanism compares the average accuracy metric from the initial snapshot to the new average accuracy metric due to the incremental ingestion of new documents and/or additional QA training pairs in the new snapshot (step 514). The routine evaluation mechanism then determines whether an accuracy metric delta identified in the comparison exceeds the accuracy metric threshold value (step 516). If at step 516 the accuracy metric delta identified in the comparison fails to exceed the accuracy metric threshold value, then the routine evaluation mechanism does not add that cluster to the report (step 518). However, if at step 516 the accuracy metric delta identified in the comparison exceeds the accuracy metric threshold value, then the routine evaluation mechanism generates a differential report between the initial snapshot and the new snapshot (step 520), which may then be sent to a subject matter expert (SME) indicating a review is needed of the training of the request processing pipeline. The routine evaluation mechanism may also, depending on implementation, cull documents within the corpora and/or updating QA pairs for which the request processing pipeline is trained in order to improve the accuracy of the request processing pipeline (step 522). The culling of documents in corpora and/or an updating of QA pairs for which the request processing pipeline may be done automatically by the routine evaluation mechanism or based on an indication from an SME subsequent to a review of the generated differential report. In either instance the accuracy of the request processing pipeline is improved over time by assessing the staleness of the request processing pipeline to keeping the system performance optimal. The operation ends thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for solving the problem using question clustering via topic modeling in combination with regular evaluation of result snapshots. After the SMEs have completed the QA pairs, the questions are clustered together using a topic model. For each question, a snapshot is created of the accuracy metrics, the top answers, and any documents that contribute significantly to answers, thereby creating a control group. On each incremental ingestion of new data into the corpus utilized by the QA system, new accuracy metrics are generated for each question and compared to the control group. SMEs are alerted to any changes in those metrics that exceed a threshold and may view a differential report to analyze the findings.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system, for routinely evaluating an accuracy of a request processing pipeline, the method comprising:

responsive to ingesting a set of new documents into a corpus of a request processing pipeline, executing a set of questions through the request processing pipeline, producing a list of answers, supporting documents, and accuracy metrics;

for each answer in the list of answers, determining whether a document contribution value of each document associated with the answer is equal to or above a document contribution threshold value;

for those documents with a document contribution value associated with the answer that is equal to or above the document contribution threshold value, storing a snapshot of the answers, highly-contributing supporting documents, and accuracy metrics in a training-data data structure;

clustering together the questions, in the set of questions, using topic modeling;

based on the clustering, for each question cluster, determining an average accuracy metric across the questions using the accuracy metrics associated with the answers stored in the training-data data structure;
comparing the average accuracy metric to an initial average accuracy metric;
determining whether an accuracy metric delta identified in the comparison exceeds an accuracy metric threshold value; and
responsive to determining that the accuracy metric delta exceeds the accuracy metric threshold value, generating a differential report indicating a review is needed of a training of the request processing pipeline.

2. The method of claim 1, wherein the set of questions is from a list of QA training pairs.

3. The method of claim 1, further comprising:
sending the differential report to an administrator;
responsive to the administrator indicating that the request processing pipeline is to be retrained, culling one or more documents from the corpus; and
initiating a retraining of the request processing pipeline.

4. The method of claim 1, further comprising:
sending the differential report to an administrator;
responsive to the administrator indicating that the request processing pipeline is to be retrained, updating a list of QA training pairs used to train the request processing pipeline; and
initiating a retraining of the request processing pipeline.

5. The method of claim 1, wherein the initial average accuracy metric is generated by the method comprising:
receiving a list of QA training pairs for initial training of the request processing pipeline;
executing a set of questions from the list of QA training pair through the request processing pipeline, producing an initial list of answers, initial set of supporting documents, and initial accuracy metrics;
for each initial answer in the initial list of answers, determining whether a document contribution value of each document associated with the initial answer is equal to or above a document contribution threshold value;
for those documents with a document contribution value associated with the initial answer that is equal to or above the document contribution threshold value, storing an initial snapshot of the initial list of answers, initial highly-contributing of supporting documents, and the initial accuracy metrics in a training-data data structure;
clustering together the initial questions using topic modeling; and
based on the clustering, for each question cluster, determining the initial average accuracy metric across the initial questions using the initial accuracy metrics associated with the initial answers stored in training-data data structure.

6. The method of claim 1, wherein the accuracy metric threshold value identifies changes in accuracy metrics of the request processing pipeline.

7. The method of claim 1, wherein the document contribution threshold value identifies a consideration of documents in the corpus and their individual contribution to a confidence of a particular answer.

8. A computer program product comprising a computer readable storage medium having a computer readable program for routinely evaluating an accuracy of a request processing pipeline stored therein, wherein the computer readable program, when executed on a computing device, causes the computing device to:
responsive to ingesting a set of new documents into a corpus of a request processing pipeline, execute a set of questions through the request processing pipeline, producing a list of answers, supporting documents, and accuracy metrics;
for each answer in the list of answers, determine whether a document contribution value of each document associated with the answer is equal to or above a document contribution threshold value;
for those documents with a document contribution value associated with the answer that is equal to or above the document contribution threshold value, store a snapshot of the answers, highly-contributing supporting documents, and accuracy metrics in a training-data data structure;
cluster together the questions, in the set of questions, using topic modeling;
based on the clustering, for each question cluster, determine an average accuracy metric across the questions using the accuracy metrics associated with the answers stored in the training-data data structure;
compare the average accuracy metric to an initial average accuracy metric;
determine whether an accuracy metric delta identified in the comparison exceeds an accuracy metric threshold value; and
responsive to determining that the accuracy metric delta exceeds the accuracy metric threshold value, generate a differential report indicating a review is needed of a training of the request processing pipeline.

9. The computer program product of claim 8, wherein the set of questions is from a list of QA training pairs.

10. The computer program product of claim 8, wherein the computer readable program further causes the computing device to:
send the differential report to an administrator;
responsive to the administrator indicating that the request processing pipeline is to be retrained, cull one or more documents from the corpus; and
initiate a retraining of the request processing pipeline.

11. The computer program product of claim 8, wherein the computer readable program further causes the computing device to:
send the differential report to an administrator;
responsive to the administrator indicating that the request processing pipeline is to be retrained, update a list of QA training pairs used to train the request processing pipeline; and
initiate a retraining of the request processing pipeline.

12. The computer program product of claim 8, wherein the computer readable program to generate the initial average accuracy metric further causes the computing device to:
receive a list of QA training pairs for initial training of the request processing pipeline;
execute a set of questions from the list of QA training pair through the request processing pipeline, producing an initial list of answers, initial set of supporting documents, and initial accuracy metrics;
for each initial answer in the initial list of answers, determine whether a document contribution value of each document associated with the initial answer is equal to or above a document contribution threshold value;
for those documents with a document contribution value associated with the initial answer that is equal to or above the document contribution threshold value, store an initial snapshot of the initial list of answers, initial highly-contributing of supporting documents, and the initial accuracy metrics in a training-data data structure;
cluster together the initial questions using topic modeling; and
based on the clustering, for each question cluster, determine the initial average accuracy metric across the initial questions using the initial accuracy metrics associated with the initial answers stored in training-data data structure.

13. The computer program product of claim 8, wherein the accuracy metric threshold value identifies changes in accuracy metrics of the request processing pipeline.

14. The computer program product of claim 8, wherein the document contribution threshold value identifies a consideration of documents in the corpus and their individual contribution to a confidence of a particular answer.

15. An apparatus for routinely evaluating an accuracy of a request processing pipeline comprising:
a processor; and
a memory coupled to the processor, wherein the memory comprises instructions which, when executed by the processor, cause the processor to:
responsive to ingesting a set of new documents into a corpus of a request processing pipeline, execute a set of questions through the request processing pipeline, producing a list of answers, supporting documents, and accuracy metrics;
for each answer in the list of answers, determine whether a document contribution value of each document associated with the answer is equal to or above a document contribution threshold value;
for those documents with a document contribution value associated with the answer that is equal to or above the document contribution threshold value, store a snapshot of the answers, highly-contributing supporting documents, and accuracy metrics in a training-data data structure;
cluster together the questions, in the set of questions, using topic modeling;
based on the clustering, for each question cluster, determine an average accuracy metric across the questions using the accuracy metrics associated with the answers stored in the training-data data structure;
compare the average accuracy metric to an initial average accuracy metric;
determine whether an accuracy metric delta identified in the comparison exceeds an accuracy metric threshold value; and
responsive to determining that the accuracy metric delta exceeds the accuracy metric threshold value, generate a differential report indicating a review is needed of a training of the request processing pipeline.

16. The apparatus of claim 15, wherein the set of questions is from a list of QA training pairs.

17. The apparatus of claim 15, wherein the instructions further cause the processor to:
send the differential report to an administrator;
responsive to the administrator indicating that the request processing pipeline is to be retrained, cull one or more documents from the corpus; and
initiate a retraining of the request processing pipeline.

18. The apparatus of claim 15, wherein the instructions further cause the processor to:
send the differential report to an administrator;
responsive to the administrator indicating that the request processing pipeline is to be retrained, update a list of QA training pairs used to train the request processing pipeline; and
initiate a retraining of the request processing pipeline.

19. The apparatus of claim 15, wherein the instructions to generate the initial average accuracy metric further cause the computing device to:
receive a list of QA training pairs for initial training of the request processing pipeline;
execute a set of questions from the list of QA training pair through the request processing pipeline, producing an initial list of answers, initial set of supporting documents, and initial accuracy metrics;
for each initial answer in the initial list of answers, determine whether a document contribution value of each document associated with the initial answer is equal to or above a document contribution threshold value;
for those documents with a document contribution value associated with the initial answer that is equal to or above the document contribution threshold value, store an initial snapshot of the initial list of answers, initial highly-contributing of supporting documents, and the initial accuracy metrics in a training-data data structure;
cluster together the initial questions using topic modeling; and
based on the clustering, for each question cluster, determine the initial average accuracy metric across the initial questions using the initial accuracy metrics associated with the initial answers stored in training-data data structure.

20. The apparatus of claim 15, wherein the accuracy metric threshold value identifies changes in accuracy metrics of the request processing pipeline and wherein the document contribution threshold value identifies a consideration of documents in the corpus and their individual contribution to a confidence of a particular answer.

* * * * *